(12) United States Patent
Männer

(10) Patent No.: US 7,128,548 B2
(45) Date of Patent: Oct. 31, 2006

(54) INJECTION MOLD WITH AN ELECTRONIC DATA STORAGE INCLUDING A COUNTER

(75) Inventor: Hans Peter Männer, Bahlingen (DE)

(73) Assignee: Otto Manner Innovation GmbH, Bahlingen (DE)

( * ) Notice: Subject to any disclaimer, the term of this patent is extended or adjusted under 35 U.S.C. 154(b) by 375 days.

(21) Appl. No.: 10/851,628

(22) Filed: May 22, 2004

(65) Prior Publication Data

US 2004/0247724 A1 Dec. 9, 2004

(30) Foreign Application Priority Data

Jun. 5, 2003 (DE) ............................ 203 08 880 U

(51) Int. Cl.
*B29C 45/80* (2006.01)
(52) U.S. Cl. ...................... 425/135; 425/169
(58) Field of Classification Search ................ 425/135, 425/169; 249/103
See application file for complete search history.

(56) References Cited

U.S. PATENT DOCUMENTS 4,010,679 A 3/1977 Dybel
5,571,539 A * 11/1996 Starkey ...................... 425/135

FOREIGN PATENT DOCUMENTS

WO WO 02/40247 5/2002

* cited by examiner

*Primary Examiner*—Tim Heitbrink
(74) *Attorney, Agent, or Firm*—Klaus J. Bach

(57) ABSTRACT

In an injection mold comprising a stationary and a movable mold half for opening and closing the injection mold, an electronic data storage with a counter for detecting and retrievably recording the number of injection molding procedures and the number of closing movements of the mold halves in the data storage is provided and the data storage is removably mounted on the injection mold and, furthermore, a sensor is provided for recording the mounting state of the data storage and also a time recording element for determining any time period for which the data storage was removed from the data storage.

16 Claims, 2 Drawing Sheets

INJECTION MOLD WITH AN ELECTRONIC DATA STORAGE INCLUDING A COUNTER

BACKGROUND OF THE INVENTION

The invention relates to an injection mold having at least two mold section of which at least one is movable relative to the other for the opening and closing of the injection mold, which includes a data storage and a counter for determining the number of injection molding procedures or the number of opening and closing of the mold sections and stores those numbers in the data storage in a retrievable manner.

Such an injection mold makes it possible for the user and also for the mold manufacturer to monitor the loading of the injection mold as far as the number of molding procedures performed is concerned. There is however a problem in this connection in that the data storage is firmly connected to the injection mold and is destroyed during cleaning of the injection mold, which occurs about twice each year, so that it then must be replaced. However, particularly the user of the injection mold is not very interested in replacing the data storage so that, in spite of becoming inoperative, the data storage is often not replaced so that the injection molding procedures can no longer be monitored.

It is therefore the object of the present invention to provide an injection mold with a data storage of the type referred to above, but which is not destroyed during cleaning of the mold so that it can continue to operate after the cleaning of the mold.

SUMMARY OF THE INVENTION

In an injection mold comprising a stationary and a movable mold half for opening and closing the injection mold, an electronic data storage with a counter for detecting and retrievably recording the number of injection molding procedures and the number of closing movements of the mold halves is provided and the data storage is removably mounted on the injection mold and, furthermore, a sensor is provided for recording the mounting state of the data storage and also a time recording element for determining any time period for which the data storage was removed from the data storage.

In this way, the data storage can be removed before the cleaning of the injection mold, but manipulation of the data storage by the user which may include keeping the data storage uninstalled after cleaning is prevented in that the removal and the time period in which the data storage was removed are recorded by the data storage. The supplier of the injection mold can therefore always examine whether the data storage was removed longer or more often than required for the necessary cleaning procedures, for example, to hide the true number of injection molding steps.

In this connection, it is expedient if the data storage is mounted to the stationary half of the mold. Then it does not have to participate in the opening and closing movement of the injection mold.

In a particularly simple and expedient embodiment of the invention, a reed switch is provided in a housing or on a support for the data storage and a magnet is provided on the mold half including the data storage adjacent to the location where the reed switch is arranged such that the magnet closes the reed switch in the mounting position of the housing. Then the reed switch is automatically opened when the data storage is removed. This is a very simple and expedient arrangement for monitoring the removal of the data storage together with its housing and to monitor also the duration of the removal. Although the data storage is arranged if possible in a closed housing, by way of such a reed switch arranged within the housing, the installed or, respectively, uninstalled state of the data storage can easily be determined by such a magnet, which is effective from without the housing.

In another important embodiment of the invention, at least one sensor is associated with the data storage for detecting and storing at least one measuring value occuring during an injection molding process as far as its value and its duration is concerned. In this way, the data storage can be used for additional control and surveillance functions and provide for the user and the supplier of the injection mold the possibility to check in what way the injection mold was used and whether load limits were exceeded during use of the injection mold.

Preferably, the at least one sensor for a measurement value occurring during the injection molding procedure is a temperature sensor. Then the pattern of the temperature can be determined and supplied to the data storage. At the same time, the time recording element can record the duration and possibly temperatures in excess of a particular maximum value and store such time and temperature values.

In this way, particularly the supplier of the injection mold is in a position to determine later whether the user of the injection mold has maintained acceptable temperature limits or whether the limits were exceeded during operation or even during periods of disuse.

The temperature sensor may be a thermo-element, which is arranged within the injection mold and is connected by a cable to the data storage which is preferably a microcontroller or microprocessor capable of converting the voltage values supplied by the temperature sensor into temperature values. Such a temperature sensor can detect large temperature variations with high accuracy for transmission to the data storage. The time recording element provided in the data storage, particularly the microcontroller, can record and store the duration of measurement values of the injection molding process exceeding a particular maximum value, for example, the temperatures. As a result, the microcontroller or, respectively, the time recording element has an additional function.

In another embodiment of the invention, a pressure sensor may be provided in the injection mold which is in communication with the data storage and which records the pressure pattern during the individual injection molding procedures such that the pressure values can be retrieved. With such an arrangement, the pressure pattern can later be examined which may be important particularly for the user of the injection mold if injection-molded parts should be found objectionable. Furthermore, excessive loads or stresses on the injection mold can be recognized.

The sensor for the counting and recording the duration of the opening and closing times can be arranged at the housing or the support of the data storage and may be specifically a piezo element. There may be a plunger which is movable relative to this sensor by the opening and the closing of the injection mold and which strikes the sensor upon closing of the mold so that the number of the opening and closing procedures and also the opening and closing durations can be determined mechanically. By means of a strike sensor in the form of a piezo element the relative movement of the mold halves during opening and particularly during closing of the injection mold can be utilized for the counting of these procedures.

In this connection, the microcontroller can record the count impulses and calculate and store the periods between the strikes of the plunger on the piezo element. As a result, the microcontroller has an additional function of counting so that a mechanical counter is not necessary and the corresponding space requirements are eliminated.

The stored values and data may be readable directly from the data storage and they may be transmitted by a transmission line or wireless to an operating device where they can be read. It is advantageous in this connection if the data storage includes an infrared transmitter, Blue Tooth, wireless LAN or similar device for a wireless connection with the operating device. Particularly if the data storage is so arranged on an injection mold that it is not readily accessible such a transmission of data is advantageous for the user.

At, or in, the housing or the support of the data storage a possibly rechargeable battery may be provided as power supply. In this way, the data storage is independent of the electric power net and its variations or interruptions.

The life of the battery may be about the same as that of the mold so that the data storage and its power supply remain always with a particular mold.

It may be mentioned that, for reading the measurement values or data, the data storage and/or the operating device may be provided with a display unit. This provides for a convenient reading of the stored retrievable values.

Particularly with a combination of individual or several of the above-described features and measures, occurrences and times of an injection molding process can be recorded which permit to obtain information concerning past operation and the conditions of the injection mold since its delivery. In this way, a process analysis can be optimized and the supplier of the injection mold is in a better position to examine warranty claims or he can reject such claims if it can be determined that the injection mold has been misused. Particularly the operating step numbers, the temperatures and/or the respective pressure patterns can be determined and stored for later retrieval and examination. The apparatus is firmly connected to the mold in order to fulfill its purpose, but it can be removed for cleaning the mold. In order to prevent manipulations, the removal of the apparatus or, respectively, the data storage from the injection mold is recorded and also the time is determined and recorded during which the data storage was removed from the mold. It can particularly be determined later whether the opening and closing times were too short resulting in damage and whether excessive temperatures were present over extended periods. Temperature measurements and their recordings particularly at critical measuring locations in the hot channel of the injection mold are particularly helpful for the process analysis.

Below an embodiment of the invention will be described in greater detail on the basis of the accompanying drawings.

DESCRIPTION OF A PREFERRED EMBODIMENT

Figure 1:
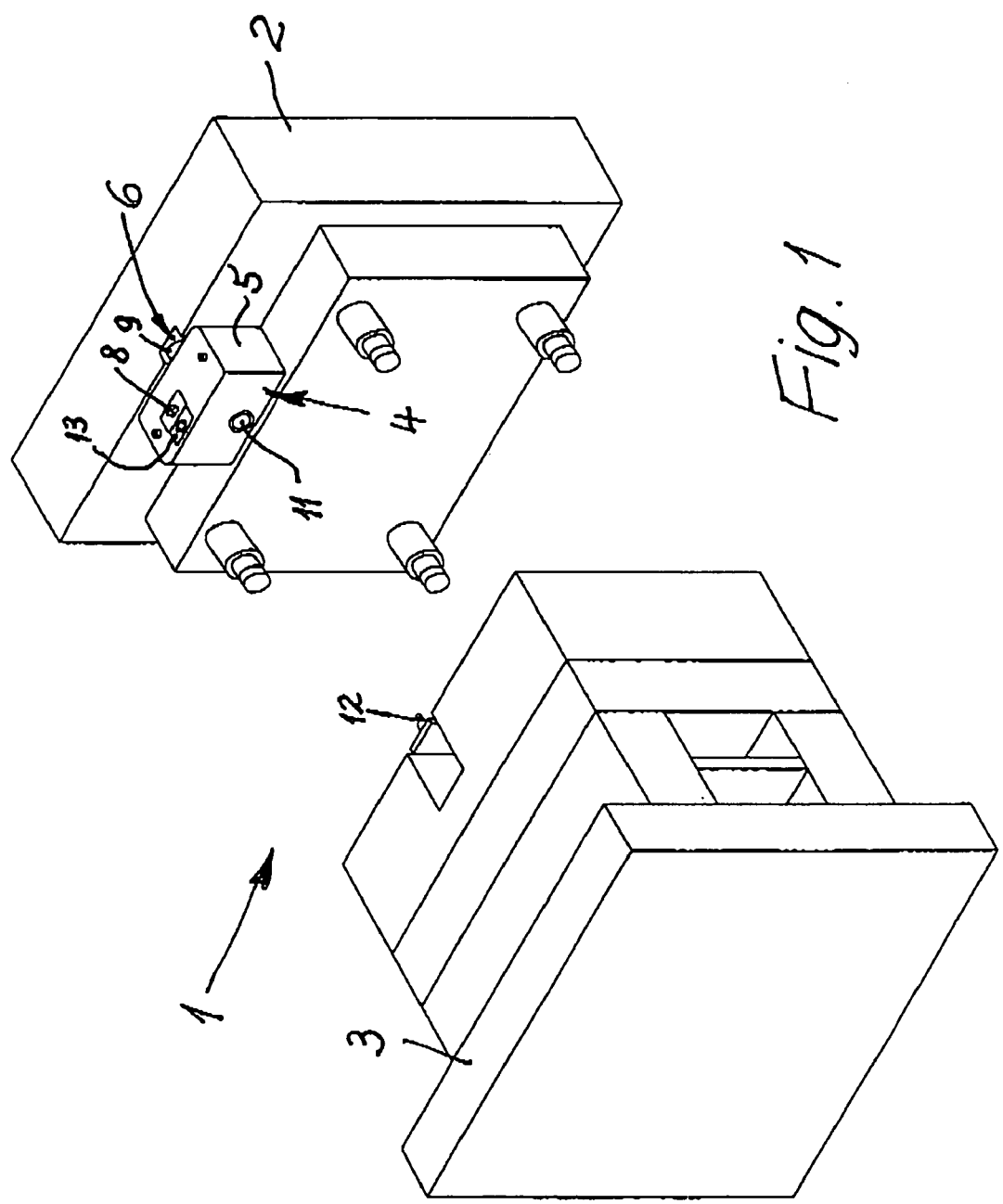
FIG. 1 shows schematically an injection mold having two mold halves in an open position wherein the negative form plates containing the negative mold cavities are not shown and wherein a data storage according to the invention is removably mounted on the stationary mold half.

An injection mold, designated overall with the reference numeral 1, for the manufacture of injection molded plastic parts, consists essentially of two mold halves, that is a stationary mold half 2 and a mold half 3 which is movable relative to the stationary mold half 2 and is shown in FIG. 1 removed from the mold half 2. For closing the mold 1, the mold half 3 is movable toward the mold half 2 in a well-known manner. The actual mold plates with the mold cavities are not shown in FIG. 1 for clarity reasons.

Figure 2:
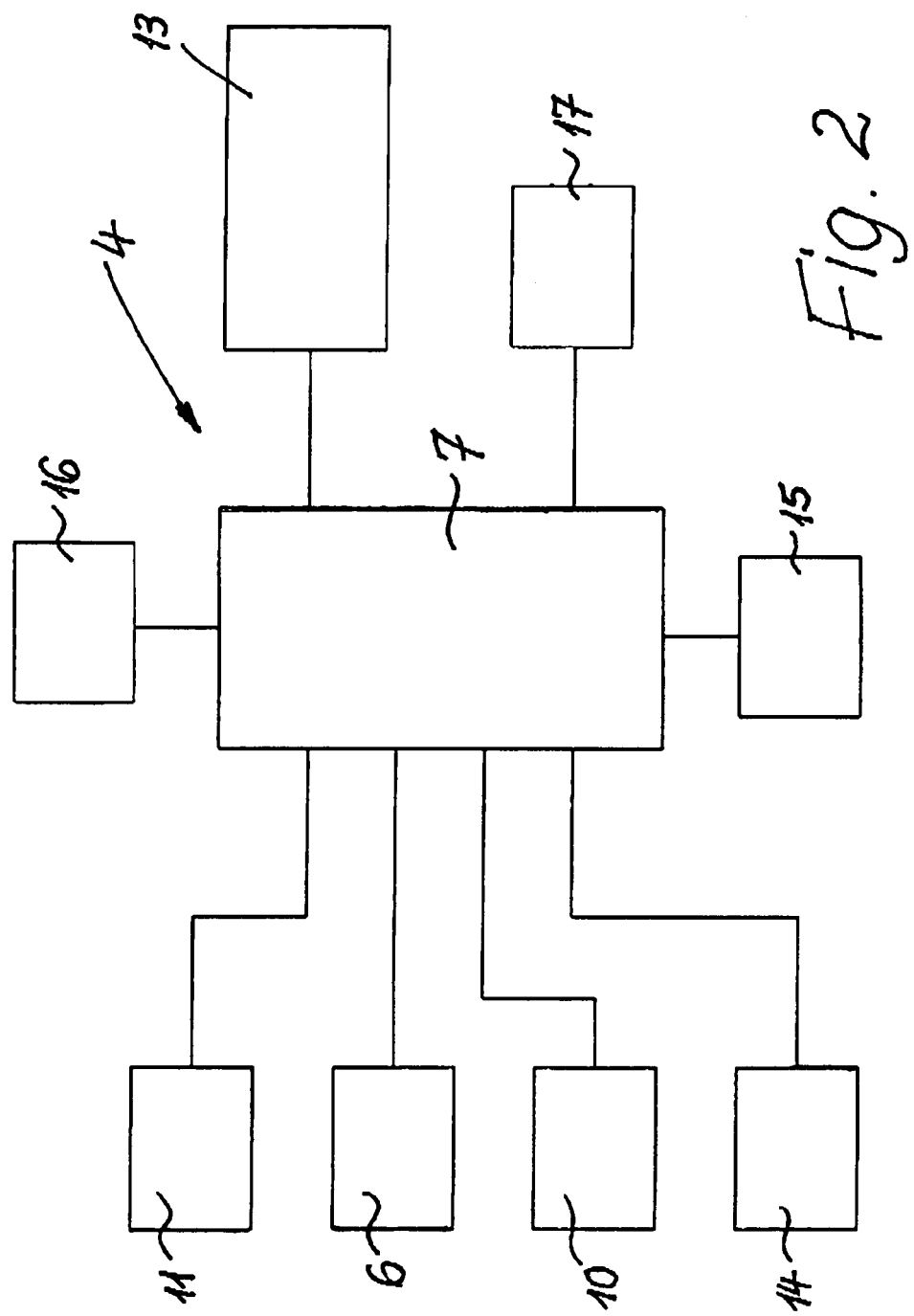
FIG. 2 shows a block diagram of the data storage and the sensors associated therewith.

On the stationary mold half 2, an electronic data storage including an electronic counter is removably supported, that is, the housing 5 including the data storage 4, whose essential components are shown in the block diagram of FIG. 2, can be removed from injection mold half 2 when necessary for the cleaning of the mold halves 2 and 3.

The data storage 4 or, respectively, the housing 5 thereof includes an unmounting sensor 6 for detecting the unmounted state and, furthermore, a microcontroller 7 with a time recorder element for determining the duration of the unmounted state. As a result, it can later be determined, for which period of time and how often the data storage 4 has been removed that is whether it has been removed for a longer period than is necessary for the cleaning of the injection mold so that the injection mold may have been used while bypassing the counter 8.

The unmounting sensor 6 may be formed for example by a reed switch arranged in the housing 5 of the data storage 4 and connected to the microcontroller 7 as shown in FIG. 2. A magnet 9 may be provided on the mold half 2 outside of the housing 5 which closes the reed switch when the housing 5 is mounted to the mold half 2, that is in the operating position as shown in FIG. 1, but which opens when the data storage is removed from the mold half 2. All this can be recorded by the microcontroller 7 in a time based manner.

FIG. 2 shows schematically that additionally a sensor 10 is connected to the data storage or, respectively, the microcontroller for sensing and recording at least one measurement value appearing during the injection molding procedure as to its size an duration. This sensor 10 may be for example a temperature sensor in the form of a thermoelement, which is arranged in the interior of the injection mold and is connected to the microcontroller by a line for supplying the measurement values to the microcontroller which converts the voltage values delivered to temperature values.

The time recording element provided in the data storage 4, and particularly in the microcontroller 7, may be specifically for recording and storing such values, particularly values which exceed certain limits. This makes it possible for the user and especially for the supplier of the injection mold 1 to examine at a later date whether the injection mold 1 has been used in a way which invalidates warranty claims.

In addition to, or in place of, temperature sensors 10, there may also be a pressure sensor 11 arranged also within the injection mold 1, which is connected to the data storage or, respectively, the microcontroller and which senses and records the pressure patterns during the particular injection molding procedures so that it can later be retrieved. With such a pressure sensor 11, the user and the supplier can monitor the appropriate use of the mold and the number of molding procedures performed.

It is also indicated particularly in FIG. 1, that this pressure sensor 11 may be used for the counting and recording of the duration of the opening and closing times at the housing 5 of the data storage 4 and which in the embodiment shown is a piezo element. The movable mold half 3 may be provided with a plunger 12, which is movable relative to the sensor 11 by the opening and closing of the injection mold 1 and, upon closing, strikes the sensor 11. As a result, the number of opening and closing steps can be mechanically determined and the duration of the opening and closing periods can be deducted from the spacing of the strikes. The microcontroller 7 of the data storage 4 can record the count impulses and calculate and store the periods between the individual strikes of the plunger 12 on the piezo element serving as the sensor 11.

The stored values and data may be readable already from the data storage 4 by way of a display 13 and/or they may be transmitted, wireless to an operating device which is not shown, where they are readable. In FIG. 2, there is indicated for this purpose an infrared transmitter 14 by way of which a wireless connection to an operating element can be established.

FIG. 2 also shows a storage element 17 of the data storage disposed in the data storage 4, which is connected to the microcontroller 7, which also serves as time recording element. Furthermore, a timer 15 is connected to the microcontroller 7 for recording the time. Finally, a battery 16 is provided in the housing 5 serving as power supply. In this way, the data storage 4 is independent of an outside power supply and of power supply lines.

The sensors 10 and 11 may not be operative when the storage 4 or respectively, its housing 5 is not arranged in the mold 1 at the mold half 2 in an operating position but is removed. In order to prevent possible manipulations, the unmounted state of the storage 4 is recorded by the earlier-described unmounting sensor 6, also with respect to the unmounting period so that the supplier of such an injection mold 1 may deny warranty claims if excessive and extensive unmounting times and periods are recorded.

What is claimed is:

1. An injection mold (1) comprising at least two mold halves (2,3) of which at least one is movable relative to the other for opening and closing the injection mold (1), said injection mold including an electronic data storage (4) with a counter (8) for detecting and retrievably recording one of the number of injection molding procedures and the number of closing movements of the mold halves in the data storage (4), said data storage being removably mounted on said injection mold, a sensor (6) in communication with said data storage for recording the mounting state of said data storage (4) and a time recording element for determining the time period over which the data storage (4) was removed from the injection mold (1).

2. An injection mold according to claim 1, wherein one of said mold halves (2,) is stationary and said data storage is mounted on said stationary mold half.

3. An injection mold according to claim 1, wherein said data storage (4) includes a housing (5) and a reed switch is diposed in said housing (5) and furthermore, a magnet (9) is arranged on said mold half carrying said data storage (4) adjacent said reed switch so as to close said reed switch when said data storage is installed but wherein said reed switch opens when said data storage is removed.

4. An injection mold according to claim 1, wherein at least one sensor (10) is provided which is connected to the data storage (4) for recording and storing the size and duration of at least one measurement value occurring during an injection molding procedure.

5. An injection mold according to claim 4, wherein said at least one sensor (10) for recording and storing at least one measurement value is a temperature sensor.

6. An injection mold according to claim 5, wherein said temperature sensor (10) is a thermoelement which is arranged in the interior of the injection mold (1) and is connected to the data storage (4) by a line for supplying voltage values thereto, said data storage including a microprocessor (7), which converts the voltage values supplied by the temperature sensor (10) to temperature values.

7. An injection mold according to claim 6, wherein said data storage includes a time recording element for determining and recording the presence and duration during which measurement values exceed predetermined limits during an injection molding procedure.

8. An injection mold according to claim 1, wherein at least one pressure sensor is provided in said injection mold (1), said pressure sensor being connected to said data storage (4) for determining and retrievably recording the pressure pattern during an injection molding procedure.

9. An injection mold according to claim 7, wherein said time recording element is connected to a contact sensor (11) which senses and retrievably stores the duration of the opening and closing periods of the injection mold (1).

10. An injection mold according to claim 9, wherein said contact sensor (11) for counting and recording the duration of the opening and closing periods is disposed on one of the housing (5) and the holder of the data storage (4) and comprises a piezo element, and a plunger (12) which is movable relative to the contact sensor (11) so as to strike said contact sensor (11) upon closing of said injection mold (1) whereby the opening and closing steps can be mechanically determined and the duration of the opening and closing periods can be determined from the time periods between said strikes.

11. An injection mold according to claim 9, wherein said microprocessor of said data storage (4) determines the number of strike impulses and the periods between the individual strike impulses between the plunger strikes on the piezo element and records these values.

12. An injection mold according to claim 11, wherein the stored values and data are directly readable from the data storage (4) and are also transferred to an operating device which includes a readout.

13. An injection mold according to claim 12, wherein said data storage includes an infrared transmitter (14) for the wireless communication with said operating device.

14. An injection mold according to claim 1, wherein said storage includes a battery (16) forming a power supply for said data storage (4).

15. An injection mold according to claim 14, wherein said battery has a life corresponding to the life expectancy of the injection mold (1).

16. An injection mold according to claim 12, wherein said operating device includes a display (13) for reading out the measurement values and dates.

* * * * *